United States Patent [19]
Campbell

[11] 3,904,677
[45] Sept. 9, 1975

[54] FORMATION OF SALTS OF TEREPHTHALIC ACID AND 5-METHYL-1,9-NONANEDIAMINE

[75] Inventor: Robert W. Campbell, Bartlesville, Okla.

[73] Assignee: Phillips Petroleum Company, Bartlesville, Okla.

[22] Filed: May 22, 1972

[21] Appl. No.: 255,553

[52] U.S. Cl............................ 260/501.2; 260/78 R
[51] Int. Cl............................................. C07c 87/14
[58] Field of Search...................... 260/501.2, 78 R

[56] References Cited
UNITED STATES PATENTS
3,575,935   4/1971   Elam.................................. 260/78 R

*Primary Examiner*—Bernard Helfin
*Assistant Examiner*—George Thomas Breitenstein

[57] ABSTRACT

Terephthalic acid and either 5-methyl-1,9-nonanediamine or an isomeric mixture of 5-methyl-1,9-nonanediamine with 2,4-dimethyl-1,8-octanediamine and/or 2,4,6-trimethyl-1,7-heptanediamine and admixed in a methanol/water medium, wherein the volume ratio of methanol to water is in the range of about 99:1 to about 80:20, and the weight ratio of terephthalic acid and diamine to the methanol/water medium is in the range of about 1:1 to about 1:3. The resulting slurry can be cooled to promote precipitation of the salt. The precipitated salt can be recovered by filtration and employed for the production of a polyamide.

7 Claims, No Drawings

FORMATION OF SALTS OF TEREPHTHALIC ACID AND 5-METHYL-1,9-NONANEDIAMINE

This invention relates to the formation of the salt of terephthalic acid and a diamine. In a specific aspect the invention relates to the medium in which the terephthalic acid and the diamine component are reacted to form the salt.

Salts of diamines and dicarboxylic acids are conventionally made either by admixing ethanol solutions of the monomers and collecting the salt which precipitates or by preparing aqueous solutions of the salt and adding an alcohol thereto to effect the precipitation of the salt. When the salt of terephthalic acid and either 5-methyl-1,9-nonanediamine or an admixture of 5-methyl-1,9-nonanediamine with 2,4-dimethyl-1,8-octanediamine and/or 2,4,6-trimethyl-1,7-heptanediamine is prepared by either of these methods, complications result. Terephthalic acid is nearly insoluble in ethanol, therefore preparing the salt in this solvent requires considerable time, for example three days, at reflux and a large amount of solvent, for example about 20 parts by weight of solvent per 1 part by weight of salt. When the salt is prepared in an aqueous solution, a large volume of alcohol, for example 10 to 20 parts by weight of alcohol per 1 part by weight of salt, is required to effect the precipitation, and the yield of salt is generally 75 to 90 percent.

In accordance with the invention, it has now been discovered that terephthalic acid and either 5-methyl-1,9-nonanediamine or an admixture of 5-methyl-1,9-nonanediamine with 2,4-dimethyl-1,8-octanediamine and/or 2,4,6-trimethyl-1,7-heptanediamine can be readily mixed together to form a slurry of salt even at room temperature in a methanol/water medium wherein the volume ratio of methanol to water is in the range of about 99:1 to 80:20. The weight ratio of terephthalic acid and diamine to the methanol/water medium can be in the range of about 1:1 to about 1:3. The resulting slurry can be cooled to promote precipitation of the salt, and then filtered, with more than 95 percent recovery of the salt being readily obtainable. The salt can be employed to form useful polyamides.

Accordingly, it is an object of the invention to provide a new and improved process for the preparation of a salt of terephthalic acid and a $C_{10}$ diamine having from 1 to 3 methyl branches. An object of the invention is to reduce the time and cost of the formation of a salt of terephthalic acid. Yet another object of the invention is to increase the percentage of salt recovered from a salt formation medium. It is an object of the present invention to provide an improved process for the production of polyterephthalamides. Other objects, aspects and advantages of the invention will be apparent from a study of the specification and the appended claims to the invention.

The presently preferred polymers produced in accordance with the present invention are linear terephthalamide polymers composed at least primarily of recurring structural units of the formula

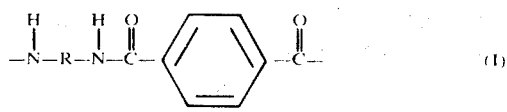

(I)

wherein R is selected from the group consisting of 5-methylnonamethylene, 2,4-dimethyloctamethylene, and 2,4,6-trimethylheptamethylene, with at least 50 percent, more preferably at least 70 percent, and more preferably at least 80 percent of the R's being 5-methylnonamethylene. Linear as used herein is meant to refer to polymer which is fusible and soluble in common solvents for polyamides, e.g., m-cresol, formic acid, etc. Polymers consisting of recurring units derived from pure 5-methyl-1,9-nonanediammonium terephthalate have been found to have useful properties. Although it is within the contemplation of the invention for the polymer to contain up to 20 weight percent of other recurring structural units, the polymer will generally have at least 90 weight percent, preferably at least 95 weight percent, and more preferably at least 98 weight percent, of its recurring structural units in the form of the $C_{10}$ diamine terephthalamide defined by formula I. Linear polymers consisting essentially of the $C_{10}$ diamine terephthalamide defined by formula I as the sole recurring unit have been found to be particularly useful. When other recurring units are present in the polymer as a result of monomeric impurities being present in the preparation of the salt, such other recurring units will generally have the formula

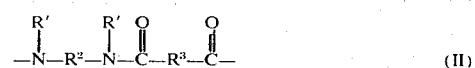

(II)

wherein each R' is independently selected from the group consisting of hydrogen and alkyl radicals having from one to four carbon atoms per radical, $R^2$ is a divalent hydrocarbon radical having from six to 16 carbon atoms, and $R^3$ is a divalent hydrocarbon radical having from four to 14 carbon atoms. For example, in the preparation of the saturated $C_{10}$ diamines having from seven to nine carbon atoms in the chain by the reaction of acrylonitrile and isobutylene and the subsequent hydrogenation of the reaction product, incomplete hydrogenation will permit the diamine product to contain olefinic materials such as 5-methyl-4-nonenediamine, 2,4-dimethyl-4-octenediamine, 2,4-dimethyl-3-octenediamine, and 2,4,6-trimethyl-3-heptenediamine. Such olefinic materials being present during the polycondensation reaction results in a polyamide having olefinic double bonds. The presence of such olefinic double bonds in the polyamide is preferably minimized, at least to the extent of having less than five olefinic double bonds per 100 R groups in the polyamide. In presently preferred embodiments of the invention, the polyamide will contain less than about one olefinic double bond per 100 R groups and more preferably less than about one olefinic double bond per 1000 R groups. Also the utilization of solvents such as methanol and ethanol with some reduction catalysts appears to result in N-alkylated $C_{10}$ diamines.

The recurring units of formula II can also be present as a result of deliberate addition of other diamines, dicarboxylic acids, or salts for the purpose of producing a copolymer. Thus diamines such as hexamethylenediamine, octamethylenediamine, nonamethylenediamine, decamethylenediamine, hexadecamethylenediamine, 1,4-cyclohexanediamine, 1,4-bis(aminomethyl)cyclohexane, bis(4-aminocyclohexyl)methane, or alkyl substituted versions thereof can be employed along with various dicarboxylic acids such as adipic acid, suberic acid, azelaic acid, sebacic acid, dodecanedioic acid, hexadecanedioic acid, 1,4-cyclohexanedicarboxylic acid, or 1,1,3-trimethyl-5-carboxy-3-(p-carboxyphenyl)indane. In lieu of, or in addition to, polymer units as represented in formula II, recurring units such as those obtained by polymerization of amino acids and/or lactams can be present. The end groups on the polymer can be varied as desired by employing various amounts of excess acid or excess diamine, or by adding known additives such as monofunctional acids.

The presently preferred polyamides of terephthalic acid and either 5-methyl-1,9-nonanediamine or an admixture of 5-methyl-1,9-nonanediamine with 2,4-dimethyl-1,8-octanediamine and/or 2,4,6-trimethyl-1,7-heptanediamine have an inherent viscosity (as measured at 30°C in a m-cresol solution having a polymer concentration of 0.5 gram/100 milliliters solution) of at least 0.6, more preferably at least 0.65 and for fiber applications most preferably in the range of about 0.7 to about 1.2. These presently preferred polyamides will also generally have a polymer melt temperature (PMT) of at least about 200°C, preferably in the range of about 225°C to about 260°C, a glass transition temperature ($T_g$) of at least 100°C, preferably in the range of about 100°C to about 120°C and more preferably in the range of about 105°C to about 115°C, a crystalline melting point ($T_m$) of at least 247°C, preferably in the range of about 247°C to about 265°C and more preferably in the range of about 250°C to about 260°C. These polyamides have been found to have infrared absorption bands near 3,300, 3,080, 2,930, 2,880, 1,630, 1,550, 1,500, 1,300, 1,020, 870, and 740 cm$^{-1}$. The polymers can be produced in the absence of any plasticizers, and as employed for fibers, will generally have less than 2 weight percent, preferably less than 0.5 weight percent, based on the weight of the fiber, of any plasticizers for the polymer. Such polymers which are at least essentially free of any plasticizers for the polymer have been found to be particularly useful for fibers as the presence of plasticizers generally lowers $T_g$, reduces crystallinity, and increases the boiling water shrinkage of the fiber. However, if desired, a plasticizer can be incorporated into the polymer and/or fiber by suitable techniques.

In accordance with the present invention, these polyamides are prepared by contacting at least one dicarboxylic acid and at least one diamine in a methanol/water medium to form the salt. The volume ratio of methanol to water in the medium is in the range of about 99:1 to about 80:20, more preferably in the range of about 95:5 to about 85:15, while the weight ratio of the total of dicarboxylic acid and diamine to the medium is in the range of about 1:1 to about 1:3, more preferably in the range of about 1:1.5 to about 1:2.5. At least 80 weight percent, preferably at least 90 weight percent, and more preferably at least 95 weight percent of the dicarboxylic acid is terephthalic acid. At least 80 weight percent, preferably at least 90 weight percent, and more preferably at least 95 weight percent of the diamine has the formula $H_2N$—R—$NH_2$, wherein R is selected from the group consisting of 5-methylnonamethylene, 2,4-dimethyloctamethylene, and 2,4,6-trimethylheptamethylene, with at least 50 percent, preferably at least 70 percent and more preferably at least 80 percent of the R's being 5-methylnonamethylene. Where other diamines are included they will generally have the formula R'HN—$R^2$—NHR' wherein R' and $R^2$ are as defined with respect to formula II. Similarly, where other dicarboxylic acids are included, they will generally have the formula HOOC—$R^3$—COOH wherein $R^3$ is as defined for formula II.

The admixture of dicarboxylic acid, diamine, methanol and water can be treated in any suitable manner to isolate the salt or the admixture can be subjected to polycondensation conditions without significant concentration or isolation of the salt. It is desirable that the temperature of the admixture, just prior to filtration, be not greater than about 30°C to aid in the precipitation of the salt. It is presently preferred to cool the admixture to a temperature below about 20°C, and then to filter the thus cooled admixture to recover the salt.

The salt can be introduced into a polycondensation reactor with or without a solvent or diluent. The reactor can be purged and then heated under autogeneous pressure to a suitable temperature, preferably less than about 310°C, and more preferably less than about 300°C. In a particularly preferred embodiment, the temperature can be raised to a value in the range of about 200°C to about 230°C and then be held at least substantially constant at that value for a time in the range of about one-half hour to about 6 hours before resuming the increasing of the temperature to the desired final value. The temperature can be held at the desired final value for a period of time, generally in the range of about one-fourth hour to about 4 hours before venting the reactor. The temperature can be maintained at the desired final value during venting to atmospheric pressure, purging with nitrogen, and subsequently reducing the pressure to a subatmospheric value, at which point the temperature and pressure will generally be maintained at least substantially constant for a period of time in the range of about one-fourth hour to about 16 hours.

The polyamides produced in accordance with the invention can be employed as molding resins, but have been found to be of particular interest in the formation of fibers. Utilizing these polyamides, fibers having a boiling water shrinkage of less than 30 percent and a zero strength temperature of at least 200°C are readily produced. The presently preferred fiber of these polyamides have a boiling water shrinkage of less than 20 percent, a zero strength temperature of at least 210°C, more preferably at least 215°C, and a tenacity of at least 2 grams per denier, and more preferably at least 3.5 grams per denier. The fibers are preferably drawn to a length at least three times, and more preferably at least 3.5 times, the original quenched length, to achieve desirable characteristics. If desired, the drawn fiber can be annealed to further reduce the boiling water shrinkage.

The following examples are presented in further illustration of the invention, but should not be construed in undue limitation thereof. MND as used herein refers to predominantly 5-methyl-1,9-nonanediamine containing isomeric $C_{10}$ diamines and a small amount of impurity. The process of this invention is utilized in Example III. Examples I and II show the use of processes outside the scope of this invention.

EXAMPLE I

In a 2-liter Erlenmeyer flask was slurried 41.52 grams (0.25 mole) of terephthalic acid (TPA) in 500 milliliters of absolute ethanol. A solution of 44.80 grams (0.26 mole) of MND (87.7 weight percent 5-methyl-1,9-nonanediamine, 11.0 weight percent 2,4-dimethyl-1,8-octanediamine, 0.2 weight percent 2,4,6-trimethyl-1,7-heptanediamine, and 1.1 weight percent N-methylated $C_{10}$ diamines) in 250 milliliters of absolute ethanol was added and the resulting mixture diluted with additional absolute ethanol to a total volume of about 1,600 milliliters. This operation was repeated, and the two batches were stirred magnetically and refluxed for 72 hours. A long reflux period was required to achieve high conversion of the terephthalic acid in view of its very limited solubility in absolute ethanol. They were then cooled to 0°C and the solids collected by filtration. After drying in a vacuum oven at 80°C, 168 grams (99.1% yield) of salt was obtained having a pH of 8.2 as a 1 weight percent aqueous solution.

EXAMPLE II

A mixture of 83.04 grams (0.50 mole) of TPA, 89.60 grams (0.52 mole) of the MND of Example I, and 86.32 grams of deionized water was placed in a 500-milliliter Erlenmeyer flask. The mixture was heated with stirring until a clear, homogeneous solution was obtained (approximately 30 minutes). It was filtered into 2,600 milliliters of methanol and the resulting mixture cooled in an ice-salt bath. The precipitated salt was collected by filtration and dried in a vacuum oven at 80°C. The dried salt (129.8 grams, 76.7% yield) had a pH of 7.5 as a 1 weight percent aqueous solution.

EXAMPLE III

In a 1-liter Erlenmeyer flask were placed 68.5 grams (0.413 mole) of terephthalic acid and 150 milliliters of a mixture of 90 volume percent methanol and 10 volume percent water. The resulting slurry was stirred magnetically, and a solution of 74.07 grams (0.429 mole) of the MND of Example I in 150 milliliters of a mixture of 90 volume percent methanol and 10 volume percent water was added. A nearly homogeneous solution was obtained within about a minute which then set up within a few minutes to an immobile white semisolid. The mixture was stirred manually for approximately 30 seconds, allowed to stand at about 25°C for 15 minutes, and then cooled in an ice bath for 2 hours. The resulting diamine salt precipitate was collected by filtration and dried at 70°–80°C under nitrogen in vacuo to give 136.5 grams (97.7% yield) of dried salt, having a pH of 8.6 as a 1 weight percent aqueous solution.

To a 1-liter autoclave were charged 135.4 grams (0.400 mole) of the above dried salt, 1.66 grams (0.010 mole) of terephthalic acid, and 35 milliliters of distilled water. Air was removed by alternately flushing with 60 psig nitrogen and evacuating three times. The system was closed off under 60 psig nitrogen, and the mixture was heated in the following manner:

| Time, minutes | Temperature, °C | Comments |
| --- | --- | --- |
| 30 | ~25–210 | heated at an at least substantially uniform rate |
| 165 | 210 | temperature maintained at least substantially constant |
| 30 | 210–290 | heated at an at least substantially uniform rate |

-Continued

| Time, minutes | Temperature, °C | Comments |
| --- | --- | --- |
| 30 | 290 | temperature maintained at least substantially constant, highest pressure registered was 360 psig |
| 30 | 290 | vented slowly to atmospheric pressure |
| 30 | 290 | slow nitrogen flush |
| 15 | 290 | pressure slowly reduced to 20 mm Hg |
| 30 | 290 | 20 mm Hg pressure |

The outlet plug was removed from the bottom of the autoclave, and most of the molten polymer was extruded using nitrogen pressure into an aqueous bath containing dry ice. The polymer remaining in the autoclave was cooled under nitrogen to about 25°C and chipped out. The combined polymer product had an inherent viscosity of 0.86 as measured at 30°C in an m-cresol solution having a polyamide concentration of 0.5 gram/100 milliliters solution, a PMT of 240°C, a $T_g$ of 110°C, and a $T_m$ of 252°C. Inherent viscosity, PMT, $T_g$, and $T_m$ were determined as described on pages 41–50 of Sorenson and Campbell, "Preparative Methods of Polymer Chemistry," Interscience Publishers, Inc., New York (1961), with the values for $T_g$ and $T_m$ being determined by differential thermal analysis of samples which have been premelted at 290°C and quenched. In these determinations of $T_g$ and $T_m$, the heating rates of the quenched samples were 10°C per minute, the determinations being made in an inert atmosphere.

Reasonable variations and modifications are possible within the scope of the foregoing disclosure.

I claim:

1. A process for the formation of a salt of terephthalic acid and a diamine which comprises contacting said terephthalic acid and said diamine at room temperature in a medium to thereby form a slurry of said salt in said medium, cooling the thus formed slurry to promote precipitation of said salt, and filtering the thus cooled slurry to recover the precipitated salt; said medium consisting essentially of methanol and water wherein the volume ratio of methanol to water in said medium during the formation and precipitation of said salt is in the range of about 99:1 to about 80:; the weight ratio of the total of acid and diamine to said medium is in the range of about 1:1 to about 1:3; wherein at least 80 weight percent of said diamine has the formula $H_2N—R—NH_2$ wherein R is selected from the group consisting of 5-methylnonamethylene, 2,4-dimethyloctamethylene, and 2,4,6-trimethylheptamethylene, with at least 50 percent of the R's being 5-methylnonamethylene, and the balance, if any, of said diamine has the formula $R'HN—R^2—NHR'$ wherein each R' is individually selected from the group consisting of hydrogen and alkyl radicals having one to four carbon atoms per radical, and $R^2$ is a divalent hydrocarbon radical having from six to 16 carbon atoms; wherein said terephthalic acid constitutes at least 80 weight percent of the total acid present and the balance, if any, of the total acid present is a second dicarboxylic acid having the formula $HOOC—R^3—COOH$ wherein $R^3$ is a divalent hydrocarbon radical having from four to 14 carbon atoms.

2. A process in accordance with claim 1 wherein at least 70 percent of the R's are 5-methylnonamethylene, wherein said volume ratio is in the range of about 95:1 to about 85:15, and wherein said weight ratio is in the range of about 1:1.5 to about 1:2.5.

3. A process in accordance with claim 2 wherein at least 95 weight percent of the total acid is terephthalic acid.

4. A process in accordance with claim 3 wherein at least 95 weight percent of the diamine has said formula $H_2N-R-NH_2$.

5. A process in accordance with claim 3 wherein said diamine comprises a mixture of 5-methyl-1,9-nonanediamine, 2,4-dimethyl-1,8-octanediamine, and 2,4,6-trimethyl-1,7-heptanediamine.

6. A process in accordance with claim 5 wherein said volume ratio is about 90:10, and wherein said terephthalic acid and said diamine are contacted in said medium at room temperature to form a nearly homogeneous solution within about a minute and to set up within a few minutes to an immobile white semi-solid.

7. A process in accordance with claim 6 wherein the thus cooled slurry is filtered to recover at least 95 percent of the salt.

* * * * *

UNITED STATES PATENT AND TRADEMARK OFFICE
CERTIFICATE OF CORRECTION

PATENT NO. : 3,904,677
DATED : September 9, 1975
INVENTOR(S) : Robert W. Campbell It is certified that error appears in the above—identified patent and that said Letters Patent are hereby corrected as shown below:

Column 6, line 48, delete "80:" and insert -- 80:20 --.

Signed and Sealed this

Thirteenth Day of July 1976

[SEAL]

Attest:

RUTH C. MASON
Attesting Officer

C. MARSHALL DANN
Commissioner of Patents and Trademarks